(12) United States Patent
Bohler et al.

(10) Patent No.: US 9,084,306 B1
(45) Date of Patent: Jul. 14, 2015

(54) DIMMING FOR LIGHT-EMITTING DIODE CIRCUITS

(71) Applicants: Christopher Lee Bohler, Peachtree City, GA (US); Li Li, Peachtree City, GA (US); Vaske Mikani, Senoia, GA (US)

(72) Inventors: Christopher Lee Bohler, Peachtree City, GA (US); Li Li, Peachtree City, GA (US); Vaske Mikani, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 104 days.

(21) Appl. No.: 13/799,543

(22) Filed: Mar. 13, 2013

Related U.S. Application Data (60) Provisional application No. 61/616,001, filed on Mar. 27, 2012.

(51) Int. Cl.
*H05B 37/02* (2006.01)
(52) U.S. Cl.
CPC ..................... *H05B 37/02* (2013.01)
(58) Field of Classification Search
CPC ........................................ H05B 37/02
USPC .......................................... 315/291
See application file for complete search history.

(56) References Cited

U.S. PATENT DOCUMENTS

| | | | | |
|---|---|---|---|---|
| 2011/0101877 A1* | 5/2011 | Zhan et al. | ..................... | 315/206 |
| 2012/0200230 A1* | 8/2012 | Esaki et al. | ............... | 315/200 R |
| 2012/0242235 A1* | 9/2012 | Naruo et al. | ................... | 315/186 |
| 2012/0262080 A1* | 10/2012 | Watanabe et al. | ............. | 315/210 |
| 2012/0299500 A1* | 11/2012 | Sadwick et al. | ............... | 315/224 |
| 2013/0106287 A1* | 5/2013 | Savicki et al. | ................. | 315/113 |
| 2013/0234617 A1* | 9/2013 | Sanghvi et al. | ............... | 315/224 |

OTHER PUBLICATIONS

LM555 Timer, Feb. 2000, National Semiconductor, p. 1-2.*

* cited by examiner

*Primary Examiner* — Douglas W Owens
*Assistant Examiner* — Monica C King
(74) *Attorney, Agent, or Firm* — King & Spalding LLP (57) ABSTRACT

A dimming circuit for a light-emitting diode fixture includes a dimming switch, a signal transfer device, and a timer. The dimming switch can include a dimming switch and generate a current at a first voltage level, where the current corresponds to a dimmer setting of the dimmer switch. The signal transfer device can include an input communicably coupled to an output, where the input of the signal transfer device is electrically coupled to the dimming switch, and where the output of the signal transfer device generates a signal at a second voltage level based on the current received by the input. The timer can be electrically coupled to the output of the signal transfer device and to a LED driver, where the timer generates a pulse width modulation (PWM) signal based on the signal, and where the timer sends the PWM signal to the LED driver.

20 Claims, 4 Drawing Sheets

DIMMING FOR LIGHT-EMITTING DIODE CIRCUITS

CROSS-REFERENCE TO RELATED APPLICATIONS

This application claims priority under 35 U.S.C. §119 to U.S. Provisional Patent Application Ser. No. 61/616,001, titled "Dimming for LED Circuit" and filed on Mar. 27, 2012, the entire contents of which are hereby incorporated herein by reference.

TECHNICAL FIELD

Embodiments described herein relate generally to control circuits for a light emitting diode (LED) fixture, and more particularly to systems, methods, and devices for providing dimming control for a LED fixture.

BACKGROUND

A number of different types of LED fixtures are used today. For example, low-cost, alternating current (AC)-powered circuits are used in LED fixtures. Dimming controls are integrated with some of these LED fixtures. A dimming control can be used to allow a user to manually or automatically control the light output of the LEDs in the LED fixture. Sometimes, when a dimming level is too low, the light output emitted by the LEDs in the LED fixture can flicker at a rate that is noticeable to the human eye.

SUMMARY

In general, in one aspect, the disclosure relates to a dimming circuit for a light emitting diode (LED) fixture. The dimming circuit can include a dimming switch input stage having a dimming switch and generating a current at a first voltage level, where the current corresponds to a dimmer setting of the dimmer switch. The dimming switch can also include a signal transfer device having an input communicably coupled to an output, where the input of the signal transfer device is electrically coupled to the dimming switch, and where the output of the signal transfer device generates a signal at a second voltage level based on the current received by the input. The dimming circuit can further include a timer electrically coupled to the output of the signal transfer device and to a LED driver, where the timer generates a pulse width modulation (PWM) signal based on the signal, and where the timer sends the PWM signal to the LED driver.

In another aspect, the disclosure can generally relate to a light emitting diode (LED) fixture. The LED fixture can include a dimming circuit, where the dimming circuit can include a dimming switch generating a current at a first voltage level. The dimming circuit of the LED fixture can also include a signal transfer device having an input communicably coupled to an output, where the input of the signal transfer device is electrically coupled to the dimming switch, and where the output of the signal transfer device generates a signal at a second voltage level based on the current received by the input. The dimming circuit of the LED fixture can further include a timer electrically coupled to the output of the signal transfer device. The timer can generate a pulse width modulation (PWM) signal based on the signal. The LED fixture can also include a LED driver electrically coupled to the dimming circuit, where the LED driver receives the signal and sends a LED current to at least one LED based on the signal.

In another aspect, the disclosure can generally relate to a method for dimming a light emitting diode (LED) of an alternating current (AC)-powered LED fixture. The method can include receiving a dimmer setting. The method can also include generating, using a signal transfer device, an input voltage that corresponds to the dimmer setting. The method can further include applying an impedance to the input voltage. The method can also include adjusting, by a timer, a pulse width modulation (PWM) control signal using the input voltage to generate an adjusted PWM control signal. The method can further include sending the adjusted PWM control signal to a LED driver, where the LED driver uses the adjusted PWM control signal to a range of current applied to the LED.

These and other aspects, objects, features, and embodiments will be apparent from the following description and the appended claims.

BRIEF DESCRIPTION OF THE DRAWINGS

The drawings illustrate only example embodiments of dimming for LED circuits and are therefore not to be considered limiting of its scope, as the dimming for LED circuits may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to dimming for LED circuits. Specifically, example embodiments may be directed to 0-10 volt (V) and/or pulse width modulation (PWM) dimming for AC-powered LED driver circuits. In certain example embodiments, dimming for LED circuits provides a number of benefits. Examples of such benefits include, but are not limited to, improved lower component costs, lower manufacturing costs, dimming control of LED circuits (particularly for AC-powered LED circuits), and lower current ripple through the LEDs.

A LED fixture in which example AC-powered LED driver circuits are included can be one or more of a number of types of fixtures that can be placed in one or more of a number of environments. Examples of types of fixtures can include, but are not limited to, new fixtures, retrofit fixtures, edge-lit wave guide fixtures, strobe lights, and egress lighting fixtures. Examples of types of environments in which a LED fixture can be placed can include, but are not limited to, indoors, outdoor, in hazardous locations, in environments exposed to heat, in environments exposed to moisture/humidity, and in chemical environments.

A user may be any person that interacts with a LED fixture. Examples of a user may include, but are not limited to, an engineer, an electrician, a homeowner, an employee, an instrumentation and controls technician, a mechanic, an operator, a consultant, a contractor, and a manufacturer's representative.

Example embodiments of dimming for LED circuits will be described more fully hereinafter with reference to the accompanying drawings, in which example embodiments of dimming for LED circuits are shown. Dimming for LED circuits may, however, be embodied in many different forms and should not be construed as limited to the example embodiments set forth herein. Rather, these example embodiments are provided so that this disclosure will be thorough and complete, and will fully convey the scope of dimming for AC-powered LED circuits to those or ordinary skill in the art. Like, but not necessarily the same, elements (also sometimes called components) in the various figures are denoted by like reference numerals for consistency.

Figure 1:
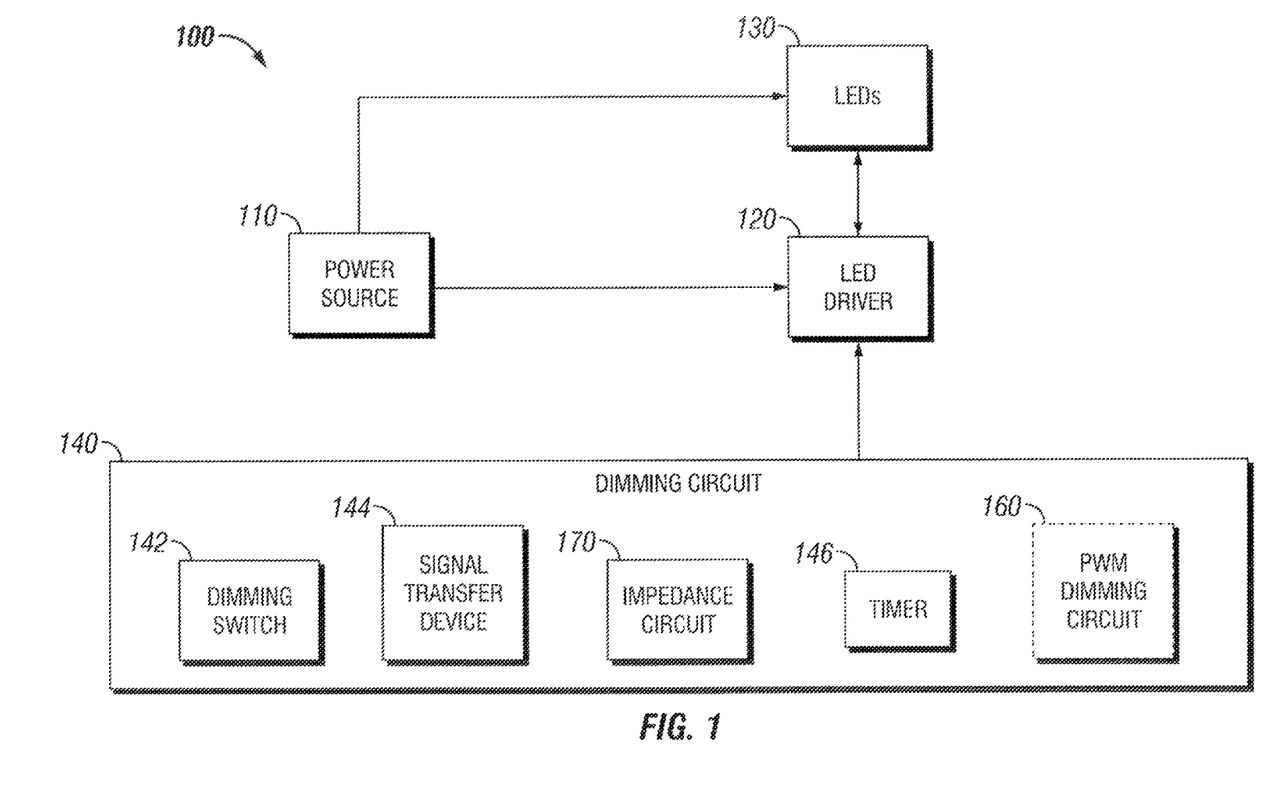
FIG. 1 shows a system diagram of an AC-powered LED circuit in accordance with one or more example embodiments.

FIG. 1 shows a system diagram of an AC-powered LED circuit 100 in accordance with one or more example embodiments. The AC-powered LED circuit 100 includes a power source 110, a LED driver 120, LEDs 130, and a dimming circuit 140. Each of these components is described below. In one or more embodiments, one or more of the features shown in FIG. 1 may be omitted, added, repeated, and/or substituted. Accordingly, embodiments of an AC-powered LED circuit should not be considered limited to the specific arrangements of components shown in FIG. 1.

In one or more example embodiments, the power source 110 is any source of electric power that provides voltage and/or current to one or more other components of the LED circuit 100. The power received by the power source 110 may be transformed, rectified, inverted, converted, and/or otherwise manipulated so that the output of the power source 110 is in an appropriate form (e.g., DC, alternating current) and of an appropriate level (e.g., 24 VDC, 120 VAC) to operate the remainder of the LED circuit 100.

The LED driver 120 is electrically coupled to the power source 110, the dimming circuit 140, and the LEDs 130. The LED driver 120 receives electrical power from the power source 110 and provides a supply of controlled voltages and/or signals to the LEDs 130 to control the operational characteristics of the LEDs 130. In certain example embodiments, the LED driver 120 may also receive an adjusted PWM control signal from the dimming circuit 140 to adjust an amount of voltage and/or current delivered to the LEDs 130. As explained below, the dimming circuit 140 may also include a PWM circuit. The LED driver 120 may include one or more of a number of single or multiple components, including but not limited to a transistor, a resistor, and a capacitor. The components of the LED driver 120 may be positioned and interconnected in one or more of a number of configurations.

The LEDs 130 are electrically coupled to the power source 110 and the LED driver 120. In one example embodiment, the LEDs 130 include one or more (an array of) LEDs coupled in series and/or in parallel. When more than one LED 130 is electrically coupled to the circuit, the LEDs 130 may be referred to as an array. An array of series-connected LEDs 130 may be one or more LEDs connected in series so that a current flows through all LEDs 130 in the array. In certain example embodiments, the LEDs 130 receive a sinusoidal voltage and/or current from the power source 110. When the voltage across the LEDs 130 exceeds the sum of the forward voltages of the LEDs 130, the LEDs 130 will conduct current (i.e., LEDs 130 will turn on). As the voltage increases, the current through LEDs 130 also increases. After the current flows through the LEDs 130, the current flows to the LED driver 120.

The example dimming circuit 140 is electrically coupled to the LED driver 120. In one or more example embodiments, the dimming circuit 140 adjusts the range of voltage and/or current applied to the LEDs 130 by the LED driver 120, which consequently limits the light output by the LEDs 130. The dimming circuit 140 may accomplish the foregoing by generating an adjusted PWM control signal and sending such adjusted PWM control signal to the LED driver 120.

In certain example embodiments, the dimming circuit 140 includes a dimming switch input stage 142, a signal transfer device 144, an impedance circuit 170, a timer 146, and, optionally, a PWM dimming circuit 160. One or more of these components of the dimming circuit 140 can be combined, omitted, duplicated, or otherwise altered from what is described below. Thus, example embodiments of a dimming circuit 140 are not limited to what is described herein.

In certain example embodiments, the dimming switch input stage 142 is a manually adjustable mechanism that allows a user to manually adjust, directly or indirectly, a setting. In this case, the setting is an amount of light output by the LEDs 130. The dimming switch input stage 142 may include one of any number of dimming switches. For example, the dimming switch input stage 142 may include a 0-10 V direct current (DC) dimming switch. The dimming switch input stage 142 may allow adjustments to be made using a dial, a switch, a sliding knob, a touchscreen, or any other suitable interface. The signal that provides the dimming adjustment may be through a direct electrical connection or by wireless communication to the LED driver 120. In certain example embodiments, the dimming switch input stage 142 sends a dimmer setting to the signal transfer device 144.

The dimming switch input stage 142 may be coupled to, or integrated with, a dimming switch (not shown). The dimming switch may be a current sinking dimming switch or a current sourcing dimming switch. The current sinking dimming switch has no source of power, and so needs an external source of power to operate. By contrast, a current sourcing dimming switch has an output voltage and requires no external source of power to operate. Example embodiments described herein may be used with either a current sinking dimming switch or a current sourcing dimming switch.

The example signal transfer device 144 can include an input and an output, where the input is electrically coupled to the dimming switch input stage 142 and the output is electrically coupled to the timer 146. In certain example embodiments, the signal transfer device 144 allows a signal from one voltage level (received at the input) to translate into a signal at a different (often higher) voltage level at the output. In other words, the signal transfer device 144 allows communication between the dimming switch input stage 142 and the timer 146 without allowing the relatively high voltage of the timer 146 to cause a fault or other electrical problem with the dimming switch input stage 142, which operates at relatively lower voltages. In addition, in certain example embodiments, the signal transfer device 144 can alter the type of voltage between the input of the signal transfer device 144 and the output of the signal transfer device 144. For example, the input of the signal transfer device 144 can receive 10 VDC from the dimming switch input stage 142 and deliver 120 VAC at the output of the signal transfer device 144. As the voltage and/or current received by the signal transfer device 144 (here, the dimmer setting) increases (or decreases), the corresponding output of the signal transfer device 144 (e.g., the input voltage) proportionally increases (or decreases).

An example of a signal transfer device 144 can be an optocoupler (also called an opto-isolator). An optocoupler is a solid state component that uses a light source (e.g., a LED) to transmit light through an optically transparent barrier between two isolated circuits. The barrier insulates the circuits by allowing light, but not current, to pass through. Those skilled in the art will appreciate that one or more other devices may be used in place of the optocoupler, provided that such one or more other devices are able to meet the operating requirements fulfilled by the optocoupler as described herein.

In certain example embodiments, the impedance circuit 170 is operably coupled to the output of the signal transfer device 144 and the timer 146. The impedance circuit 170 can create oscillation, which can cause the output of the signal transfer device 144 to control the duty rate of the timer 146 and the PWM control signal generated by the timer 146. The impedance circuit 170 can include one or more of a number of discrete components and/or an integrated circuit. In addition, or in the alternative, the impedance circuit 170 can be driven by software executing on a hardware processor. Examples of such discrete components may include, but are not limited to, one or more resistors.

The example timer 146 is a circuit that generates accurate time delays and/or oscillations. Specifically, the timer 146 may convert an input voltage (for example, as received by the signal transfer device 144) to a PWM control signal, which may be delivered to the LEDs 130 and/or the LED driver 120. For example, the PWM control signal may be used to turn on and/or off the main transistor of the LED driver 120. In certain example embodiments, the timer 146 converts the input voltage to the PWM control signal using a linear (or mostly linear) relationship.

The timer 146 may also control one or more other functions within the LED circuit 100, including, but not limited to, the frequency. The timer 146 may consist of discrete components, an integrated circuit (IC), and/or a software-based device (e.g., a programmable logic controller). Discrete components may include, but are not limited to, one or more of any number of a resistor, a capacitor, and a diode. For example, a diode 242, shown in FIG. 2 below, may be used to adjust the duty rate of the timer 146.

In one or more example embodiments, the dimming circuit 140 optionally includes a PWM dimming circuit 160. The PWM dimming circuit 160 generates a forward current that is adequate to drive the LEDs 130. The dimming using the PWM dimming circuit 160 is accomplished by intermittently providing and terminating current to the LEDs at a high frequency that is not detectable to the human eye. For a lower dimming level, the PWM dimming circuit 160 provides shorter periods of current relative to not providing current to the LEDs 130. The PWM dimming circuit 160 may be independent of, or in addition to, the dimming switch input stage 142. The PWM dimming circuit 160 may also include a signal transfer device (e.g., an optocoupler), which may be different than the signal transfer device 144 described above, or may be a different, logically separate channel of the signal transfer device 144. In certain example embodiments, the PWM dimming circuit 160 can be part of the AC-powered LED circuit 100, and the dimming switch input stage 142 is omitted from the AC-powered LED circuit 100.

Figure 2:
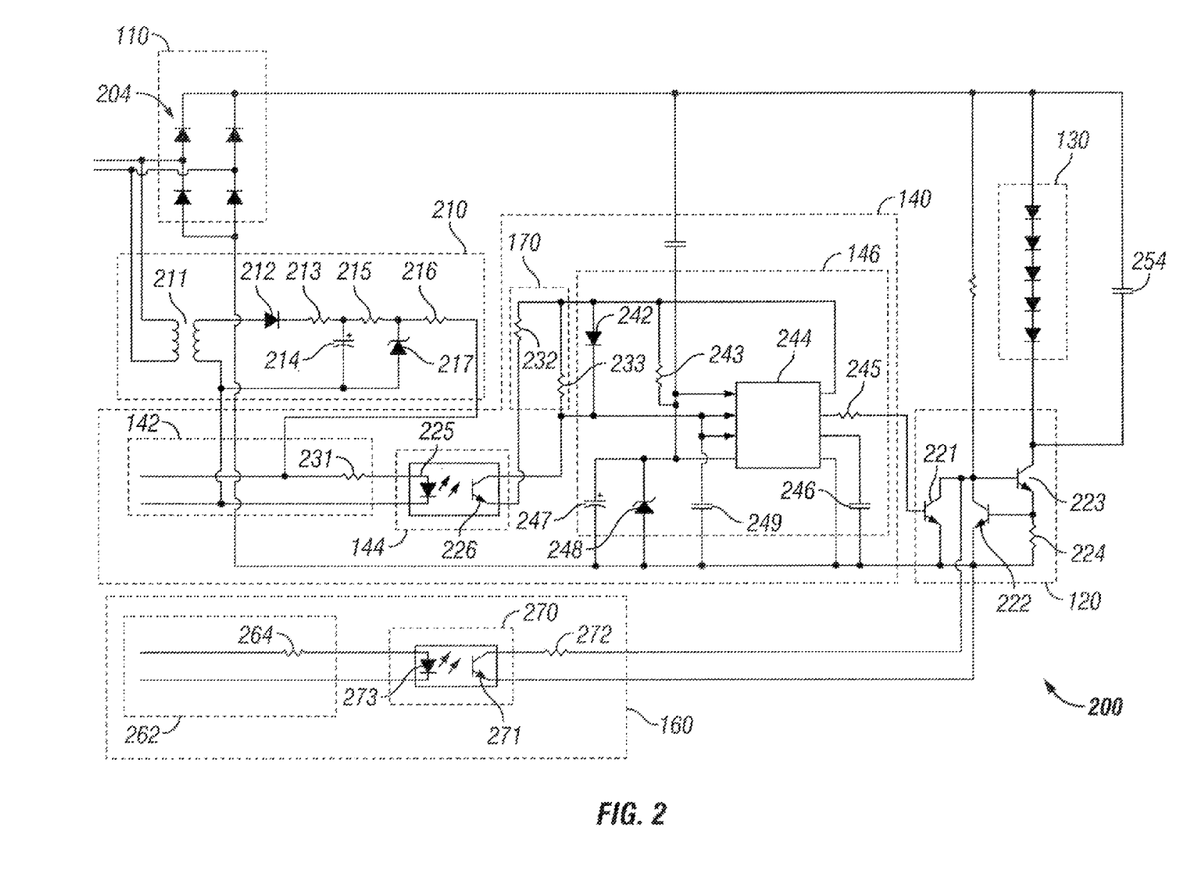
FIG. 2 shows a schematic diagram of an AC-powered LED circuit in accordance with one or more example embodiments.

FIG. 2 presents a schematic diagram of an AC-powered LED circuit 200 in accordance with one or more example embodiments. The LED circuit 200 includes the power source 110, an optional alternative power source 210, the LED driver 120, multiple LEDs 130 (also called an array of LEDs 130), the dimming circuit 140, and the optional PWM dimming circuit 160. The power source 110, the LED driver 120, the LEDs 130, and the PWM dimming circuit 160 are substantially similar to the corresponding components described above with respect to FIG. 1.

In this example, the power source 110 is a full wave bridge rectifier 204 that converts the AC voltage into positive going voltages (generates the absolute value of the amplitude of the sinusoidal voltage wave). The LED driver 120 in this example includes transistor 221, transistor 222, transistor 223, and resistor 224, electrically connected to each other, as well as to the output of the LEDs 130, as shown in FIG. 2.

The optional alternative power source 210 shown in FIG. 2 may be used to provide power to a current sinking dimming switch. If a current sourcing dimming switch is used, then the alternative power source 210 may be omitted from the circuit 200. The alternative power source 210 may derive its power from the power source 110, as shown in FIG. 2. For example, the alternative power source 210 may receive its power from a secondary winding of a transformer 211, where the primary side of the transformer 211 is electrically coupled to the voltage source that feeds the power source 110. Alternatively, or in addition, the alternative power source 210 may receive its power independently of the power source 110.

The alternative power source 210 may include one or more of a number of one or more components (e.g., resistor 213, resistor 215, resistor 216, transformer 211, capacitor 214, diode 212, zener diode 217) that are arranged in one or more of a number of configurations. In addition, or in the alternative, the alternative power source 210 is a integrated electric circuit (e.g., IC, programmable logic controller) that is used to provide electric power to a current sinking dimming switch. In certain example embodiments, the alternative power source 210 is electrically coupled to the dimming switch input stage 142 of the dimming circuit 140. The alternative power source 210 can, in certain embodiments, receive 120 VAC from the power source 110 and deliver up to 10 VDC to the dimming switch input stage 142.

In one or more example embodiments, the dimming circuit 140 includes the dimming switch input stage 142, the signal transfer device 144, and the timer 146. The dimming switch input stage 142 in this example is a 0-10 VDC dimming switch. The dimming switch input stage 142 includes a resistor 231 (shown in FIG. 2 as connected in series with the positive leg of the dimming switch). The resistor 231 converts the voltage from the 0-10 VDC dimming switch to a current, which is delivered to the input of the signal transfer device 144. The amount of resistance of the resistor 231 may depend on one or more of a number of factors, including but not limited to the type of signal transfer device 144 and the range (e.g., 0-10 VDC) of the dimming switch input stage 142.

The signal transfer device 144 in this example is an optocoupler that includes an input and an output. The input of the optocoupler is a LED 225, which emits light in proportion to the voltage at the dimming switch input stage 142. Specifically, the LED 225 transmits light through an optically transparent barrier (not shown) positioned between the LED 225 (representing the input) and the transistor 226. The barrier insulates the circuits by allowing light, but not current, to pass therethrough. The output of the signal transfer device 144, shown in FIG. 2 as being generated by a transistor 226 of an optocoupler, is a current and/or voltage. The output of the signal transfer device 144 may be referred to as a signal, an input voltage, and/or an input current. The output of the signal transfer device 144 is derived from the light emitted by the LED 225. The stronger (or weaker) the light emitted by the LED 225, the stronger (or weaker) the output generated by the transistor 226. In certain example embodiments, an impedance circuit 170 is electrically coupled between the output of the signal transfer device 144 and the timer 146. As discussed above, the impedance circuit 170 can include one or more of a number of discrete devices (e.g., a resistor, a capacitor) and/or an integrated circuit.

For example, as shown in FIG. 2, the impedance circuit 170 can include resistor 233, which is positioned in series with the collector of the transistor 226 generating the output of the signal transfer device 144. In addition, or alternatively, the impedance circuit 170 can include resistor 232, which is shown in FIG. 2 as being electrically coupled in parallel across the collector and emitter of the transistor 226 generating the output of the signal transfer device 144. In such a case, impedance circuit 170 (e.g., resistor 233 and resistor 232) may act like an oscillator. In other words, in such a case, when the input voltage generated by the transistor 226 of the signal transfer device 144 is relatively high, the impedance of the impedance circuit 170 (in this case, resistor 233, the resistor 232, and the transistor 226) is low. Likewise, when the input voltage generated by the transistor 226 is relatively low, the impedance of the impedance circuit 170 (in this case, resistor 233, the resistor 232, and the transistor 226) are high. The oscillation created by the impedance circuit causes the input voltage to control the duty rate of the timer 146 and the PWM control signal output by the timer 146.

In certain example embodiments, a capacitor 254 is positioned in parallel with the LEDs 130 and prior to the LED driver 120. The frequency of the current, set by the PWM controller circuit output by the timer 146 and flowing through the LEDs 130, may be relatively high and cause the LEDs 130 to have high frequency current ripple. Capacitor 254, positioned as shown in FIG. 2, may be configured to reduce or eliminate this current ripple with regard to the LEDs 130. Specifically, the capacitor 254 builds a charge as current flows through the LEDs 130. When the current delivered to the LEDs 130 falls below a threshold value, the capacitor 254 releases its charge, which combines with the current delivered to the LEDs 130 to increase the current to a level that exceeds the threshold value. As a result, the current, enhanced by the charge released by the capacitor, flows through the LEDs 130, keeping the LEDs illuminated. The capacitor 254 may be one or more of a number of different types of capacitors, including but not limited to a ceramic capacitor.

The threshold value can be determined by one or more of a number of factors, including but not limited to the operating characteristics of the LEDs 130.

In another example embodiment, a similar dimming circuit may be used in the optional PWM dimming circuit 160. The PWM dimming circuit 160 may include a PWM dimming switch 262 and an signal transfer device 270, which in this case is an optocoupler. Output from the signal transfer device 270 (specifically in this case, transistor 271 of the optocoupler) may be fed into the LED driver 120 and/or a timer (e.g., timer 146). The PWM dimming switch 262 may include a resistor 264 connected in series with the positive leg of the PWM dimming switch 262. The resistor 264 converts the voltage from the PWM dimming switch to a current, which is delivered to the light source 273 of the signal transfer device 270. The amount of resistance of the resistor 264 may depend on one or more of a number of factors, including but not limited to the type of signal transfer device 270 and the range of the PWM dimming switch 262.

Resistor 272, placed in series with the collector of the transistor generating the output of the signal transfer device 270, may act like a switch. When the impedance of the resistor 272 increases, as caused by the decreased input voltage generated by the transistor 271 of the output of the signal transfer device 270, the PWM dimming circuit 260 circuit opens. Likewise, the impedance of the resistor 272 decreases, as caused by the increased input voltage generated by the transistor 271 of the output of the signal transfer device 270, the PWM dimming circuit 260 circuit closes.

The timer 146 is electrically coupled to the LED driver 120, the output of the signal transfer device 144, and the impedance circuit 170. In this example includes an IC 244 and a number of discrete components. The discrete components, as shown in FIG. 2, include diode 242, resistor 243, resistor 245, capacitor 246, capacitor 247, zener diode 248, and capacitor 249. The IC 244 can include a number of terminals (pins) that receive a number of inputs (e.g., supply voltage, ground, threshold, control voltage, reset, trigger, discharge) and one or more outputs. The IC 244 shown in FIG. 2 is a LM555CMM integrated circuit.

Figure 3:
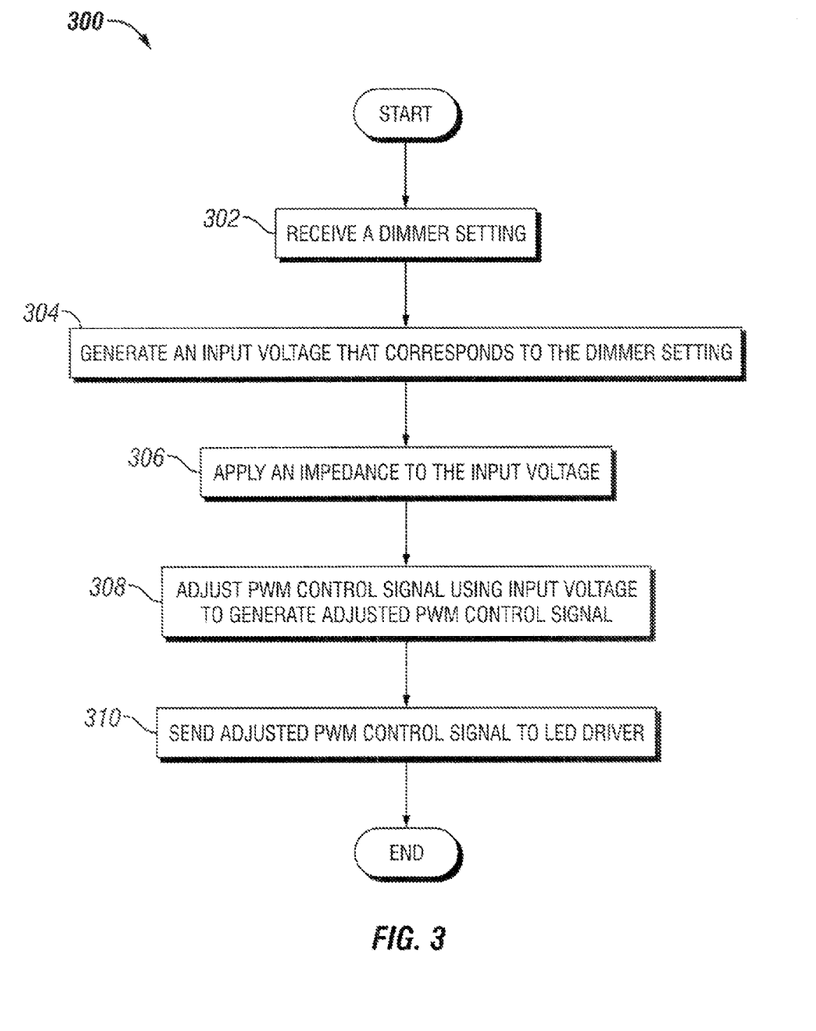
FIG. 3 is a flowchart presenting a method for dimming LEDs with an AC-powered LED driver in accordance with one or more example embodiments.

FIG. 3 is a flowchart presenting an example method 300 for dimming LEDs with an AC-powered LED driver 120 in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 3, may be included in performing this method. Accordingly, the specific arrangement of steps should not be construed as limiting the scope. In addition, a particular computing device, as described, for example, in FIG. 4 below, may be used to perform one or more of the steps for the method 300 described below.

Referring now to FIGS. 1-3, the example method 300 begins at the START step and proceeds to Step 302, where a dimmer setting is received. In certain example embodiments, the dimmer setting may be received by the signal transfer device 144 at the dimming circuit 140 based on a change in position or other type of adjustment of the dimming switch input stage 142. For example, when a 0-10 VDC is set at 5 VDC, the dimmer setting is approximately 50%. The dimming switch input stage 142 may be controlled by some entity, including but not limited to a user, a computer, or a wireless controller. The dimmer setting may be a low voltage and/or a low current signal.

In Step 304, an input voltage that corresponds to the dimmer setting is generated. The input voltage may be at a higher voltage than the voltage (and corresponding current) of the dimmer setting. In certain example embodiments, the input voltage may be generated using the output (e.g., a transistor 226) of the signal transfer device 144. As an alternative, an input current, rather than an input voltage, can be generated in this step 304.

In Step 306, an impedance is applied to the input voltage. The impedance may be in the form of one or more resistors 233, 232 and/or some other impedance circuit. The impedance may be inversely proportional to the level of input voltage provided by the signal transfer device 144. For example, if the level of the input voltage is high, the impedance may be low. As another example, if the level of the input voltage is low, the impedance may be high.

In Step 308, a PWM control signal is adjusted using the input voltage. In such a case, an adjusted PWM control signal is generated. In certain example embodiments, the PWM control signal is generated by the PWM dimming circuit 160. Specifically, a PWM dimmer setting may be received by the signal transfer device 270 of the PWM dimming circuit 160 based on a change in position or other type of adjustment of the PWM dimming switch 262. The PWM dimming switch 262 may be controlled by some entity, including but not limited to a user, a computer, or a wireless controller. The PWM control signal may be generated using the output (e.g., a transistor 271) of the signal transfer device 270. The PWM control signal may include a duty rate. The PWM control signal may be controlled by and the adjusted PWM control signal may be generated by the timer 146.

In Step 310, the adjusted PWM control signal is sent from the dimming circuit 140 to the AC-powered LED driver 120. The LED driver 120 may be part of an AC-powered LED circuit 100. The adjusted PWM control signal may control the range of voltage and/or current applied to the LEDs 130 that are being supplied power or controlled by the LED driver 120 of the AC-powered LED circuit 200. In certain example embodiments, the adjusted PWM control signal can be compensated when the adjusted PWM control signal falls below a threshold value. Specifically, if the PWM control signal falls below a certain level (current ripple) that can cause the LEDs 130 to flicker, capacitor 254 can release current to boost the PWM control signal that flows through the LEDs 130 to reduce or eliminate the current ripple and the resulting flickering effect of the LEDs 130. After step 310 is complete, the method 300 can end with the END step.

In certain example embodiments, the adjusted PWM control signal can be enhanced when the adjusted PWM control signal falls below a threshold value. The threshold value can be based on one or more of a number of factors, including but not limited to the operating characteristics of the LEDs 130. The adjusted PWM control signal can be enhanced by the capacitor 254 electrically coupled in parallel with the LEDs 130. Specifically, the capacitor 254 can release its stored charge when the current (derived from the adjusted PWM control signal) delivered to the LEDs 130 by the LED driver 120 is too low to flow through the LEDs 130. In such a case, the charge released by the capacitor 254 combines with the current delivered to the LEDs 130 to raise the level of the current above the threshold value. Thus, the current enhanced by the charge from the capacitor 254 can flow through the LEDs 130.

In certain example embodiments, the method 300 can be a continuously performed when power is continuously applied to a LED fixture 100 using example embodiments described herein.

Figure 4:
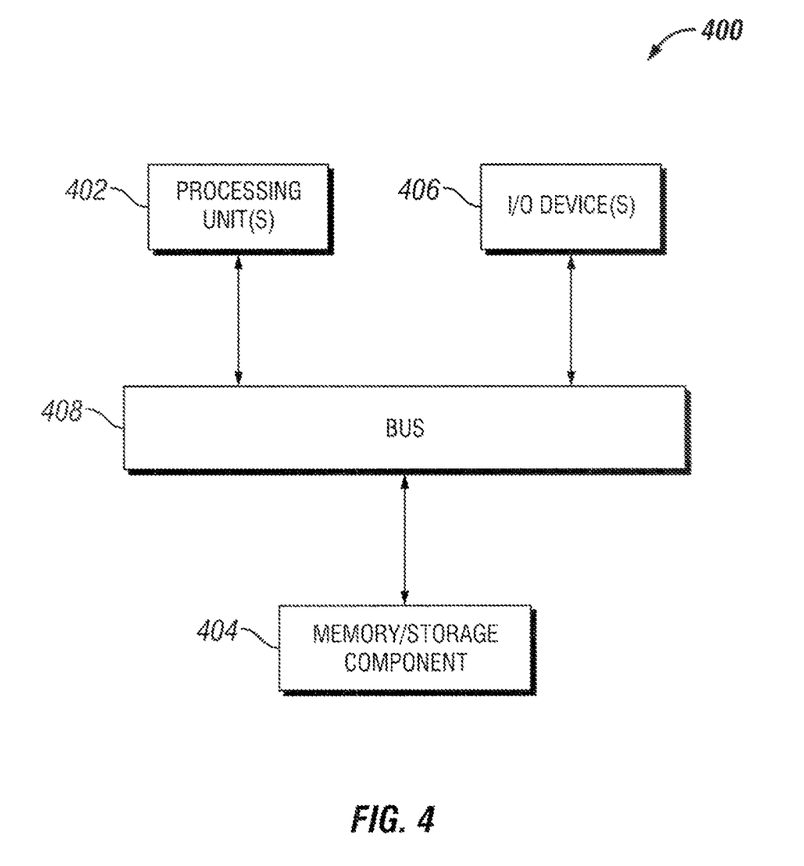
FIG. 4 shows a computer system used with an exemplary AC-powered LED circuit in accordance with certain exemplary embodiments.

FIG. 4 illustrates one embodiment of a computing device 400 capable of implementing one or more of the various techniques described herein, and which may be representative, in whole or in part, of the elements described herein. Computing device 400 is only one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400. As shown in FIG. 4, the bus 408 is operatively coupled to each of the processing unit(s) 402, the I/O device(s) 406, and the memory/storage component 404.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Memory/storage component 404 may include volatile media (such as random access memory (RAM)) and/or nonvolatile media (such as read only memory (ROM), flash memory, optical disks, magnetic disks, and so forth). Memory/storage component 404 can include fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 400 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 400 includes at least the minimal processing, input, and/or output means necessary to practice one or more embodiments.

Further, those skilled in the art will appreciate that one or more elements of the aforementioned computer device 400 may be located at a remote location and connected to the other elements over a network. Further, one or more exemplary embodiments may be implemented on a distributed system having a plurality of nodes, where each portion of the implementation (e.g., IC 244) may be located on a different node within the distributed system. In one or more embodiments, the node corresponds to a computer system. Alternatively, the node may correspond to a processor with associated physical memory. The node may alternatively correspond to a processor with shared memory and/or resources.

In one or more example embodiments, dimming for LED circuits reduces current ripple effect, decreases the cost of parts and manufacturing, and allows for better dimming control of AC-powered LED circuits, particularly for low-cost AC-powered LED circuits.

Accordingly, many modifications and other embodiments set forth herein will come to mind to one skilled in the art to which dimming for LED circuits pertain having the benefit of the teachings presented in the foregoing descriptions and the associated drawings. Therefore, it is to be understood that dimming for LED circuits are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A dimming circuit for a light emitting diode (LED) fixture, comprising:
    a dimming switch input stage comprising a dimming switch and generating a current based on a dimmer level of the dimmer switch;
    a signal transfer device comprising an input communicably coupled to an output, wherein the input of the signal transfer device is electrically coupled to the dimming switch, and wherein the output of the signal transfer device generates a signal based on the current received by the input; and
    a pulse width modulation (PWM) signal generator electrically coupled to the output of the signal transfer device and to an alternating current (AC) LED driver, wherein the AC LED driver comprises a linear regulator-based current control circuit that regulates a LED current generated by the AC LED driver, wherein the PWM signal generator generates a PWM signal based on the signal, and wherein the PWM signal generator sends the PWM signal to the AC LED driver to enable or disable the AC LED driver, wherein the PWM signal is at high frequency.

2. The dimming circuit of claim 1, wherein the signal transfer device comprises an optocoupler.

3. The dimming circuit of claim 1, wherein the first dimmer level is no greater than 10 volts direct current, and wherein the output of the signal transfer device operates at approximately 120 volts AC.

4. The dimming circuit of claim 1, wherein the PWM signal generator comprises a LM555CMM integrated circuit.

5. The dimming circuit of claim 1, wherein the PWM signal generated by the PWM signal generator modifies an original PWM signal generated by a PWM dimming circuit.

6. The dimming circuit of claim 1, further comprising:
    an impedance circuit having an impedance and electrically coupled to the output of the signal transfer device and the PWM signal generator, wherein the impedance circuit causes the signal to control a duty rate of the PWM signal generator.

7. The dimming circuit of claim 6, wherein the impedance circuit comprises at least two resistors electrically connected across the output of the signal transfer device and act as an oscillator.

8. The dimming circuit of claim 7, wherein the impedance circuit further comprises a transistor, wherein the transistor is part of the output of the signal transfer device when the signal transfer device is an optocoupler.

9. The dimming circuit of claim 8, wherein the impedance of the impedance circuit is low when the dimmer level of the dimming switch is high.

10. The dimming circuit of claim 8, wherein the impedance of the impedance circuit is high when the dimmer level of the dimming switch is low.

11. The dimming circuit of claim 6, further comprising:
    a diode electrically coupled in parallel with the impedance circuit and with the PWM signal generator, wherein the diode further controls the duty rate of the PWM signal generator.

12. The dimming circuit of claim 1, wherein the PWM signal generator regulates an AC LED current without using a substantial energy storage device, wherein the AC LED current is generated by the AC LED driver and sent to at least one LED.

13. A light emitting diode (LED) fixture, comprising:
    a dimming circuit, comprising:
        a dimming switch generating a dimming signal based on a dimmer level;
        a signal transfer device comprising an input communicably coupled to an output, wherein the input of the signal transfer device is electrically coupled to the dimming switch, and wherein the output of the signal transfer device generates a signal based on the dimming signal received by the input; and
        a pulse width modulation (PWM) signal generator electrically coupled to the output of the signal transfer device, wherein the PWM signal generator generates a PWM signal based on the signal; and
    an alternating current (AC) LED driver electrically coupled to the dimming circuit, wherein the AC LED driver comprises a linear regulator-based current control circuit that regulates a LED current generated by the AC LED driver, wherein the AC LED driver receives and is enabled or disabled by the PWM signal, wherein the AC LED driver, when enabled by the PWM signal, sends the AC LED current to at least one LED, wherein the AC LED current is based on the dimming signal, wherein the PWM signal is at high frequency.

14. The LED fixture of claim 13, further comprising:
    a PWM dimming circuit electrically coupled to the timer, wherein the PWM dimming circuit generates an original PWM signal that is based on a level of a PWM dimming switch,
    wherein the original PWM signal is modified by the pulse width modulation (PWM) signal generator based on the signal from the signal transfer device to generate the PWM signal.

15. The LED fixture of claim 13, further comprising:
    an impedance circuit electrically coupled to the output of the signal transfer device, wherein the impedance circuit causes the signal to control a duty rate of the pulse width modulation (PWM) signal generator, wherein the duty rate controls the frequency at which the AC LED driver powers the at least one LED.

16. The LED fixture of claim 13, further comprising:
    a power source electrically coupled to the AC LED driver, wherein the power source provides power to the AC LED driver.

17. The LED fixture of claim 16, further comprising:
    an alternative power source electrically coupled to the power source and the dimming circuit, wherein the alternative power source generates alternative power based on the power received from the power source, and wherein alternative power is provided to the dimming circuit when the dimming switch is a current sinking dimming switch.

18. The LED fixture of claim 13, further comprising:
a capacitor electrically coupled in parallel with the at least one LED, wherein the capacitor releases a charge when the AC LED current falls below a threshold value.

19. A method for dimming a light emitting diode (LED) of an alternating current (AC)-powered LED fixture, the method comprising:
  detecting a dimmer setting;
  generating, based on detecting the dimmer setting, a pulse width modulation (PWM) signal that corresponds to the dimmer setting; and
  controlling an alternating current (AC) LED driver by enabling or disabling the AC LED driver using the PWM signal at high frequency.

20. The method of claim 19, wherein the AC LED driver, when controlled using the PWM signal, turns on at least one LED when the PWM signal is low.

* * * * *